Figures 1, 5:
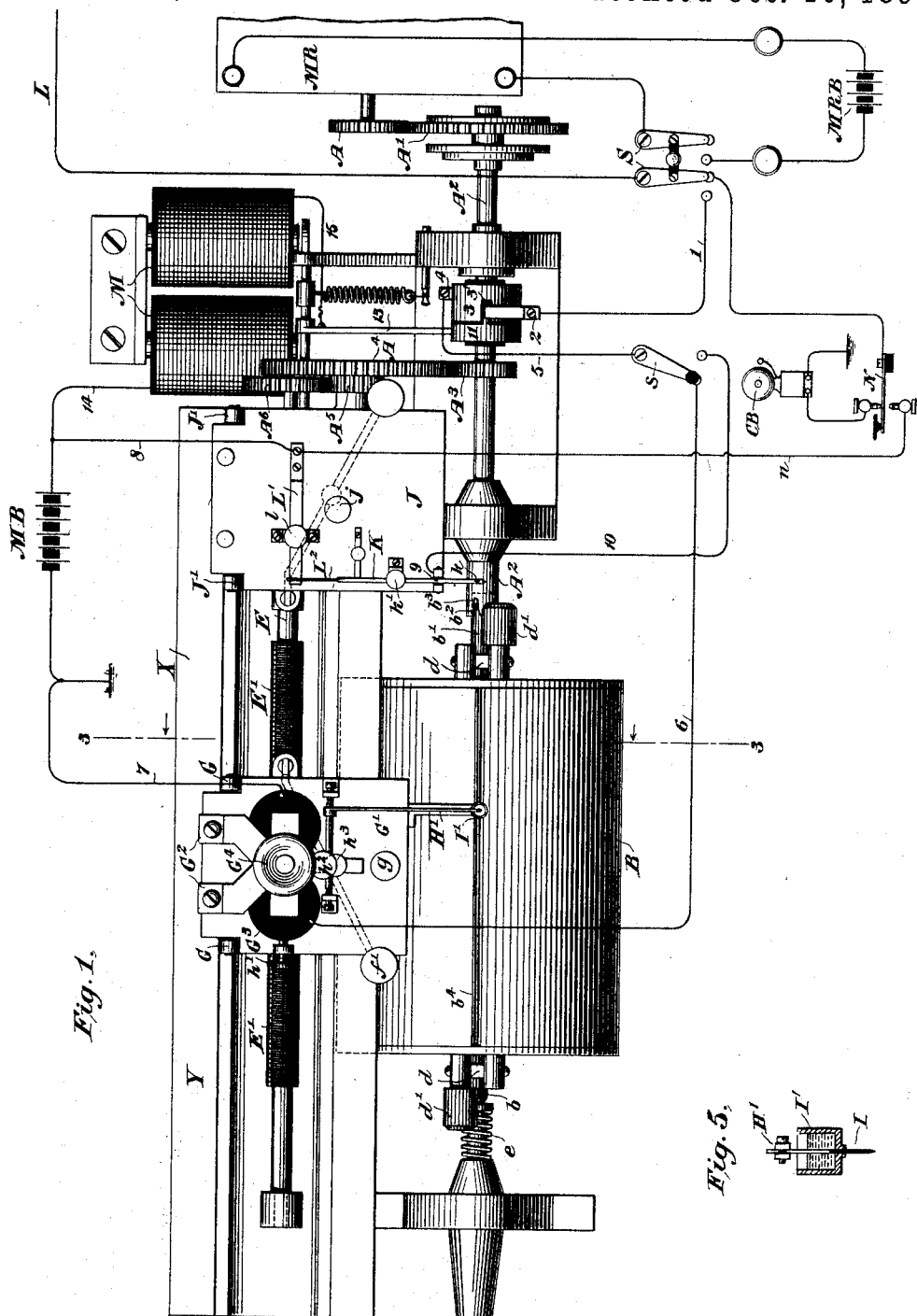

(No Model.)  3 Sheets—Sheet 1.
R. J. SHEEHY.
AUTOGRAPHIC TELEGRAPH.
No. 506,275.  Patented Oct. 10, 1893.

Witnesses
Geo. W. Breck.
Edward Thorpe.

Inventor
Robert J. Sheehy
By his Attorneys
Baldwin, Davidson & Wight

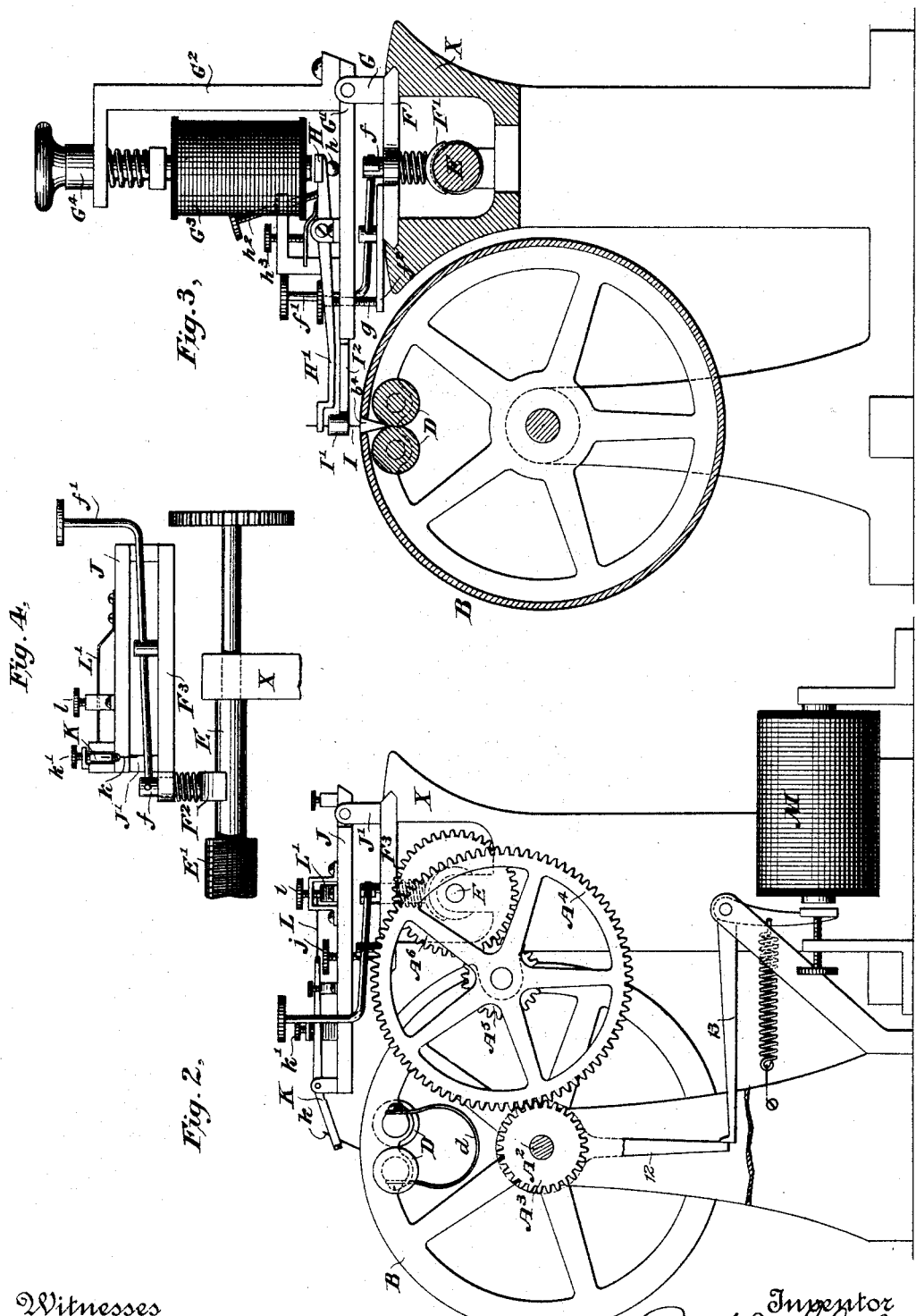

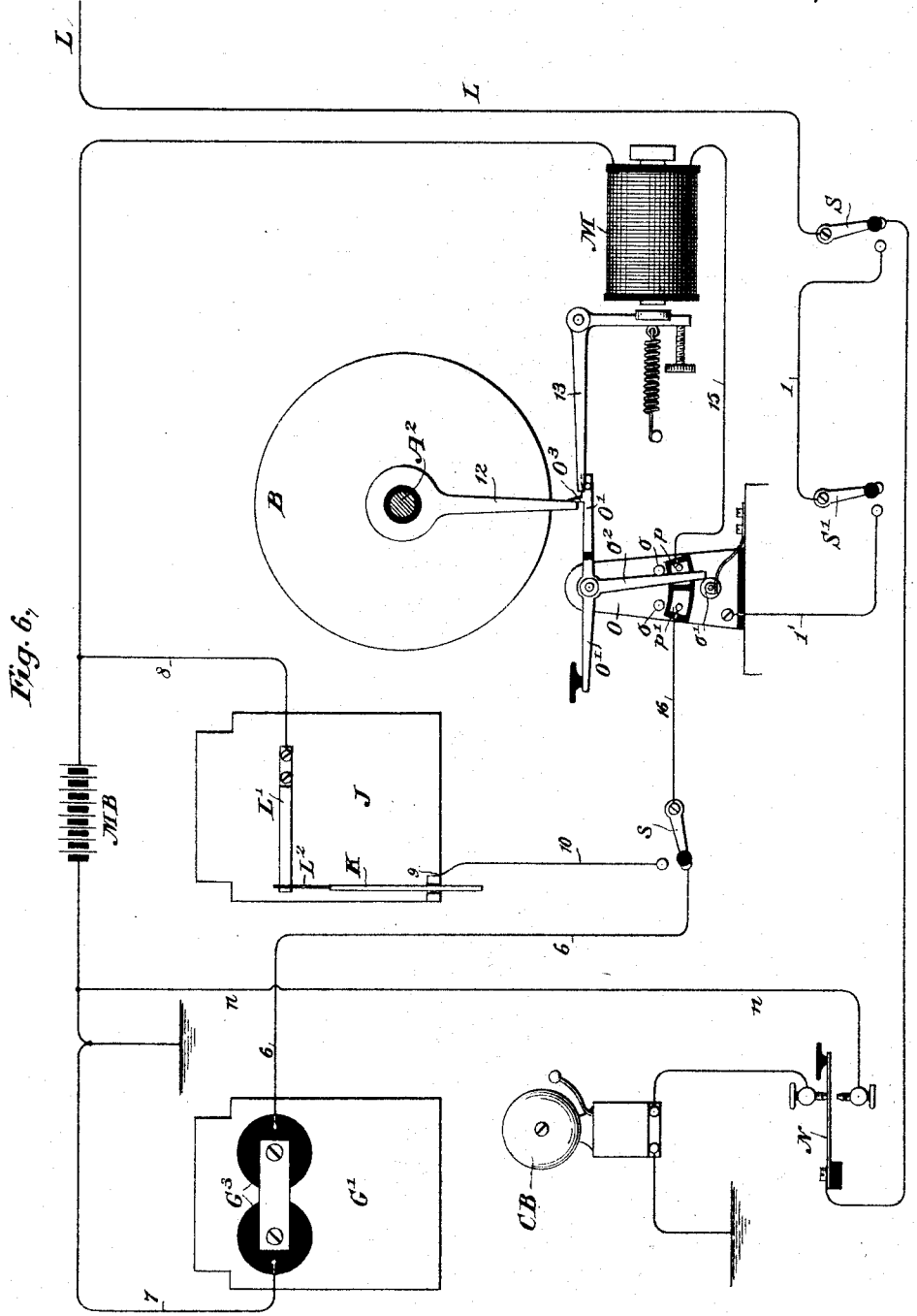

UNITED STATES PATENT OFFICE.

ROBERT J. SHEEHY, OF NEW YORK, N. Y., ASSIGNOR, BY MESNE ASSIGNMENTS, TO WENDELL GOODWIN, OF SAME PLACE.

AUTOGRAPHIC TELEGRAPH.

SPECIFICATION forming part of Letters Patent No. 506,275, dated October 10, 1893.

Application filed March 3, 1891. Renewed March 15, 1893. Serial No. 466,179. (No model.)

*To all whom it may concern:*

Be it known that I, ROBERT J. SHEEHY, a citizen of the United States, residing at New York city, New York, have invented certain new and useful Improvements in Autographic or Fac-Simile Telegraphs, of which the following is a specification.

In my instrument, as in others of this class, two surfaces are employed moving respectively under transmitting and receiving pens or styluses. As usual I use revolving cylinders. For proper and satisfactory work it is essential that these cylinders should revolve synchronously or isochronously at the same uniform speed.

My invention comprehends improved means for maintaining the transmitting and receiving cylinders in proper relation to each other by a system of correction of the speed of either cylinder, the corrections occurring once in each revolution.

The invention further consists in certain improvements in details, of construction of the traveling carriages carrying respectively the transmitting and receiving styluses.

The invention further consists in certain improvements in the receiving pen for recording the transmitted message in ordinary ink upon ordinary paper.

The invention further consists in certain other novel organizations of instrumentalities, all as hereinafter explained in detail.

As is perfectly well understood in connection with this class of apparatus, the transmission of the written messages or other matter, whatever it may be, may be effected in a variety of ways, some of which it may be as well to mention. For instance, the writing or matter to be transmitted may be inscribed in insulating ink upon a metal plate or metalized paper. The stylus traversing this plate completes a circuit which may be the main line circuit, and whenever the stylus crosses the insulating ink the circuit is broken. With such an arrangement the matter transmitted would be indicated at the receiving station upon paper or other receiving material by undiscolored or unmarked portions upon a ground marked by ink, or discolored by chemical action. At the transmitting station, however, the circuit completed through the stylus and conducting plate might be a shunt around the main battery, and in that event the current would go to line whenever the stylus came in contact with the insulating ink. Then the received matter would be represented by discolorations or marks produced or inscribed on the receiving paper, leaving all other portions of the paper clear. A second way of effecting the transmission would be to employ very thick ink so that the transmitting stylus in passing over the line would be mechanically lifted to either complete or break the main line circuit connection with the transmitting battery or to make or break a shunt around said battery, according as it may be desired to reproduce the matter at the receiving station, either negatively or positively, as above suggested. A third way would be to produce the same effect as that last mentioned by embossing, the matter to be transmitted upon suitable paper or other material, the raised portions or the corresponding depressions upon the opposite side acting to mechanically operate the stylus to control the connection of the main line with the transmitting battery. Reception may be accomplished chemically, as is well understood, or the received matter may be inscribed in ink upon a sheet of paper, surrounding the receiving cylinder, by a suitable pen controlled by a magnet in the coils of which the impulses of current transmitted over the main line become effective.

My invention as above stated, comprehends certain improvements whereby the received matter may be inscribed in ordinary ink upon the receiving sheet. Aside from this, however, the apparatus herein described, is capable of use in any of the ordinary ways above suggested, and all of these ways being common and thoroughly well understood by those conversant with fac simile telegraphs, it has been thought unnecessary to illustrate or further describe them.

In the accompanying drawings Figure 1 is a plan view of my improved apparatus with the circuit connections and main battery diagrammatically shown. Fig. 2 is a side elevation showing the transmitting apparatus and stylus in proper relation to the cylinder; Fig. 3 a cross section on the line 3 3, of Fig. 1, showing the receiving pen in proper relation to the receiving cylinder; Fig. 4 a detail view showing the carriage that carries the transmitting stylus disengaged from the driving worm; Fig. 5 a detail view showing the special construction of the recording pen. Fig. 6 is a diagram showing an arrangement for starting and stopping the cylinders when the correction of the cylinders is dispensed with.

The apparatus at each station is a combined transmitter and receiver, and it is therefore only necessary to illustrate the organization at one terminal of the main line.

M R illustrates a motor of any suitable character which may be either electric or non-electric. The motor shown may be assumed to be an electric motor, M R B being the motor battery or source of electrical energy. The main line L runs to one lever of a double lever switch S. When the switch is in the position shown in the drawings, the connection through either the transmitting or receiving devices is broken, and the local motor circuit is open. When the switch is swung to the left the motor circuit is closed and the main line is placed in connection with the wire 1. The motor shaft carries a gear A that meshes with a gear $A'$ frictionally connected with the main driving shaft $A^2$. The receiving or transmitting cylinder B is mounted upon a short axle, the ends of which project and form trunnions $b\ b'$. The end or trunnion $b'$ is removably seated in a socket in the end of the main driving shaft $A^2$. The wall of the socket is formed with a notch, one side of which is inclined so that the opening is larger at the end of the shaft than at the bottom of the notch. A pin $b^3$ on the trunnion $b'$ enters this notch and locks the trunnion with the shaft $A^2$. The opposite trunnion $b$ is pointed as shown and has its seat in a socket in the end of a plunger C, provided with a handle $C'$ and a coiled spring $e$, that normally presses the follower toward the cylinder. The cylinder is placed in position by withdrawing the follower C, introducing the end $b'$ of the cylinder shaft into the socket of the main driving shaft and then permitting the follower under the action of its spring to close up against the opposite end $b$ of the cylinder shaft. The purpose of making the notch $b^2$ largest at the opening is to permit of the ready insertion of the pin $b^3$. New cylinders for either transmission or reception may, therefore, readily be placed in position and removed, and when in position they are locked with the driving shaft so as to revolve with it. At one point in the cylinder there is a longitudinal opening or slot $b^4$ and beneath the surface of this cylinder are two gripping rolls D, the bite of which is immediately opposite the slot. These rolls are elastically pressed against each other by a spring $d$ at each end, and the shaft of each roll is provided with a thumb piece $d'$ by which it may be rotated. In this manner a sheet of paper or other material, either prepared for transmission or adapted for the reception of a communication, may be stretched tightly upon the cylinder, the ends being introduced into the slot and into the bite of the rolls D D, which may be rotated to draw the paper taut around the cylinder. When the motor is running the main shaft $A^2$ and cylinder B will be rotated, and yet the cylinder and shaft may be arrested without stopping the motor for the purpose of correcting its speed with reference to the distant shaft and cylinder as hereinafter described. A pinion $A^3$ on the main shaft meshes with a large gear $A^4$ on a short counter shaft carrying a pinion $A^5$ that meshes with the gear wheel $A^6$ on the worm shaft E. In Fig. 1 the receiving recording devices are shown as being driven by the worm $E'$ longitudinally to the cylinder as the cylinder revolves. The receiving devices are shown more in detail in the cross section, Fig. 3. As seen from this figure the worm shaft E is mounted in bearings in the bottom of a trough or depression in the frame X, and at the top of the trough the frame or bed plate F which carries the receiving devices is shown as traveling in ways in the frame X. A threaded shoe $F'$ carried by a short rod $f$ projecting through the bed plate F is pressed into contact with the worm by a spiral spring as shown, so that as the shaft revolves the bed plate or carriage of the receiving devices is driven longitudinally with reference to the worm shaft and cylinder. By means of a lever $f'$ pivoted on the bed plate F and connected with the upper end of the rod $f$, the rod may be raised against the force of the coiled spring to disengage the threaded shoe $E'$ from the worm, and the carriage may then be moved by hand into the desired position for reception; or to the position of inaction, say to the point Y, when the apparatus is being used for transmission, as hereinafter described. At the rear of the bed plate F are lugs G in which a platform $G'$ is hinged. The forward edge of the platform may be raised or lowered with reference to the bed plate and to adjust the pen with reference to the cylinder, by means of a thumb screw $g$, which passes through a screw threaded aperture in the platform and bears upon a projection $f^2$, mounted on the bed plate F. A bracket on the rear of the platform $G'$ carries at its upper end a vertically arranged electro motor magnet $G^3$, the pole pieces of which are at the bottom and which may be adjusted vertically by means of a thumb piece $G^4$ passing through the horizontal arm of the bracket. The armature H of this magnet is mounted upon an armature lever $H'$ pivoted on the platform $G'$ and the end of which projects over the cylinder and carries the recording pen or stylus I. The adjustable bottom stop or limit of this armature is the eccentric end $h$ of a screw $h'$ projecting at one side of the platform $G'$. $h^2$ is an adjustable screw forming the upper stop or limit of the armature lever, and $h^3$ an adjustable screw by means of which the armature lever spring that is carried by the lever is adjusted. Assuming that the instrument is receiving, the worm $E'$ and cylinder are revolving, and the receiving carriage is moved longitudinally while the cylinder revolves under the recording pen. Normally the armature lever is lifted by its spring so that the pen is out of contact with the surface of the cylinder, or the paper thereon, and whenever the electro magnet $G^3$ is energized by an impulse of electricity transmitted over the line, the pen or stylus I is thrown down upon the cylinder, producing the proper mark thereon.

The circuits, when the apparatus is receiving are as follows: from the main battery M B at the distant station to the switch S, line 1, brush 2, insulated conducting ring 3 on the main shaft $A^2$, brush 4, and by wire 5 to switch lever $s$ which is then to the left as shown in the drawings, thence by wire 6 to the coils of the magnet $G^3$, and by wire 7 to earth.

The details of construction of the pen I, are seen in Fig. 5. It consists of a fine pointed steel pin, split centrally, and mounted in the outer end of the armature lever $H'$. This pin works through an aperture, in which it loosely fits, in the bottom of an ink cup $I'$ mounted in an arm $I^2$, projecting from the front edge of the platform $G'$. This construction is adopted because it insures a free flow of the ink and an unerring record on the paper sheet carried by the cylinder.

Assuming that the instrument is transmitting, the receiving carriage is moved to one side to the position indicated by Y, out of connection with the worm $E'$, and the transmitting carriage is moved into position to be driven by the worm. The details of this part of the apparatus are shown in Figs. 2 and 4. The bed plate $F^3$ of the transmitting carriage is fitted and travels in the ways in the frame X. It has a threaded shoe $F^2$, carried and operated in the manner already described in connection with the receiving carriage, so that the threaded shoe may be brought into engagement with the worm or disengaged therefrom so that the carriage may be moved into the position of inaction shown in Fig. 1.

A platform J is pivoted in lugs $J'$ at the rear of the bed plate and is raised or lowered at the front with reference to the bed plate by a thumb screw $j$ to adjust the transmitting stylus $k$ with reference to the surface of the cylinder. At the front edge of the carriage the lever K is pivoted, and in the front end of this lever is mounted the transmitting stylus $k$, under which the cylinder rotates. $k'$ is an adjustable screw which constitutes the upper limit of this lever. The rear end of the lever is provided with a delicate spring L, which, when the lever is thrown up, makes contact with an adjustable contact spring $L'$. This spring is mounted upon the platform J and is adjusted by means of a screw $l$. As before stated, for transmission, the surface of the cylinder will be provided with a record of the matter to be transmitted, of such a character that the stylus $k$ is raised and lowered, as the cylinder revolves beneath it.

The circuits for transmission may be traced as follows: from earth to one pole of the main battery M B, from the opposite pole of the battery by wire 8 to the contact spring $L'$, and by the spring L on the end of the lever K to the pivot 9 of this lever, and by wire 10 to the button of the switch lever $s$, which should then be thrown over to the right; thence by wire 5, brush 4, insulated ring 3, brush 2, wire 1, and switch S to line. As the worm $E'$ is rotated the transmitting carriage is caused to move longitudinally along the cylinder, and the cylinder with the prepared surface thereon revolving beneath the stylus $k$ opens and closes the main line circuit at the contacts L $L'$, and causes a succession of impulses, dependent in period upon the matter inscribed on the surface of the cylinder, to be transmitted over the line. These impulses becoming active in the coils of the receiving magnet $G^3$, cause the pen operated thereby to produce a record upon the receiving cylinder as already described.

To provide for receiving and sending calls between the two terminal stations, I connect the switch contact with which the main line switch lever S is in contact when the instruments are not in operation, that is when the switch is in the position shown in the drawings, with a key N that normally rests against its top contact from which a wire runs through a call bell C B to earth. The bottom contact of the key is connected by a wire $n$ with the main battery M B. By depressing the key, therefore, at either station, when the switch S is in the position shown, a current will pass from the main battery, at the station making the call by wire $n$, key N over the main line to the key N at the distant station and through the call bell to earth. Either operator may, therefore, call the other, and the apparatus being put into condition for operation the desired matter is transmitted and recorded.

The proper synchronous movement of the cylinders with reference to each other is effected by the following arrangement: The insulated conducting ring 3 is formed with a slot $3'$ in one edge, and into this slot projects a tooth on an insulated collar 11 arranged alongside of the ring 3. This collar carries a radial arm 12, see Fig. 2, that abuts against the end of an armature lever 13, when the lever is retracted by its spring as shown in this figure. The magnet M of this armature lever has one terminal of its coils connected by wire 14 with the main battery M B and the opposite terminal is connected by wire 15 with the armature lever 13. If the transmitting cylinder runs ahead of the receiving cylinder, it will be arrested by the arm 12 abutting against the end of the armature lever 13.

A circuit will then be completed from the main battery by wire 14, through the coils of magnet M, wire 15, and parts 13, 12, 11, 2, and wire 1 to line, and over the line through the receiving magnet $G^3$ to earth. But the current is not of sufficient strength to energize the magnet M and the only effect at the receiving end will be to hold the pen against the cylinder; but as the cylinders can only be a very small fraction of their circumference out of synchronism the marking of the receiving paper close to the zero line or slot in the receiving cylinder is immaterial. When, however, the receiving cylinder reaches a corresponding position and is similarly arrested, both main batteries are connected with the line, both magnets $G^3$ are cut out of circuit (the brushes 2, 2, resting then upon the teeth of the collars 11, 11) and the magnets M attract their armatures, and both the instruments start at exactly the same point. The operation would be the same if the receiving instrument should run ahead of the sending instrument. With this arrangement the actuating motors, whatever their character, are regulated to uniform speed as far as possible, and as corrections of the cylinders are made once in each revolution of the cylinders, there is little liability of their running so far out of synchronism as to escape the prompt correction described and mar the transmission of the message.

These instruments may be operated in connection with suitable exchange systems, so that any two subscribers may be connected at the central office for independent communication.

I may employ corrected motors and in that event the devices for correcting the cylinders may be dispensed with, the speed corrections being made in the motors themselves, according to any known plan. Or if the motors be alternating current motors or dynamos acting as motors, their synchronous relation may be maintained according to the method disclosed in my application No. 375,605, filed December 23, 1890; and a series of autographic instruments may be driven from a single controlled dynamo or motor at each end of the line and the corresponding pairs of instruments at the two terminals of the line be connected by independent main lines, as set forth in said application.

With any arrangement in which the motors are maintained in synchronism and the devices for correcting the cylinders are dispensed with, I should employ some means under the control of the operator for starting and stopping the instruments. The following arrangement shown in Fig. 6 is a suitable one. In this organization the collars 3 and 11, and their brushes are omitted. The line L runs to one of the levers of the switch S, as already described, and when the switch is thrown to the left the circuit passes by wire 1 to the lever of a switch S', and from its contact by wire 1' to an insulated metal post O. In the top of this post and in electrical connection therewith is pivoted a key or hand lever O', and the outer end of which passes under the end of the armature lever 13 and also carries a stop $O^3$, and when the lever is depressed the radial arm 12 carried by the cylinder abuts against this stop and the cylinder is arrested at the neutral point. The end of the lever that carries the stop $O^3$ is insulated from the other portion of the lever. When the magnet M attracts its armature as presently described, the outer end of the armature lever 13 is thrown down, pressing the end of the lever O', with which it is in contact, downwardly and moving the stop $O^3$ out of the path of the arm 12, thus permitting the cylinder to rotate. A depending contact arm $O^2$ carried by the lever or key O', plays between limiting stops $o$ and sweeps two insulated contacts $p$, $p'$, mounted on the metallic post O. The wire 15 from the magnet M is connected with the contact $p$. A wire 16 connected with the contact $p'$ runs to the lever of the switch $s$ by which the apparatus is switched for transmission or reception, as already described. A roller $o'$ mounted upon a spring-arm holds the contact-arm $O^2$ in either position into which it may be swung by the raising or lowering of the outer end of the key or lever O'. When an operator desires to stop his instrument, the outer end of the lever O' is depressed and the cylinder is arrested when the radial arm 12 comes in contact with the stop $O^3$. Assuming that both instruments are at rest and that one operator wishes to call up the other for the transmission of a message, he depresses the key N, thus sending a calling current from his battery over the line and ringing the call bell at the distant station. The distant operator thereupon moves his switch S to the left so as to place the main line in connection with the wire 1 and also places his switch S' on its contact so as to connect the wire 1 with the wire 1'. There will be a circuit from ground at the distant station through the distant main battery, coils of magnet M, contact $p$, contact $O^2$, and metal post O, through the switches S' and S to the switch S of the operator who sent the calling signal. This operator then moves his switches S and S', to complete the circuit at his instrument through the wires 1, 1'. There will then be a complete circuit from the ground at one station through the main battery and magnet M, at that station, thence over the main line through the magnet M and main battery at the distant station, and thence to ground. The magnets M, therefore, simultaneously attract their armatures, and the stops $O^3$ are thrown out of the paths of the radial arms 12, and both cylinders start together. When the transmission of the message is completed both operators may stop their instruments at the zero point by depressing the levers O' and opening the switches S'.

I claim as my invention—

1. The combination, substantially as set forth, of a motor, a shaft frictionally driven thereby, the message transmitting or receiving cylinder revolving with said shaft, the insulated contact rings also revolving with said shaft, contact brushes 2, 4, bearing upon one of said rings, a tooth on the other ring projecting into the path of one of said brushes, the detent arm 12, carried by the revolving shaft, the magnet M, its armature lever, and circuit connections, substantially as described, whereby the correction of the speed of the cylinder may be accomplished once in each revolution.

2. In a fac-simile telegraph the combination of a transmitting or receiving cylinder having a longitudinal slot $b^4$ in its periphery, the friction rolls D, D, arranged within the cylinder with their bite opposite said slot and means for rotating the rolls to clamp and draw the transmitting or receiving sheet taut about the cylinder.

3. The combination, substantially as set forth, of the receiving cylinder the traveling frame or carriage moving longitudinally with reference to the cylinder, an ink cup carried by said frame and having an aperture in its bottom, the recording pen also mounted on said carriage and working through the aperture in the bottom of the ink cup, and the magnet for vibrating the pen, also carried by said frame or carriage.

4. The combination, substantially as set forth, in an autographic telegraph recording device, of an ink cup having a perforated bottom, a split needle or pin having two free nibs or inscribing points working through said perforation and a magnet for vibrating the pen.

5. The combination, substantially as set forth, of a motor, a shaft frictionally driven thereby, a recording or transmitting cylinder driven by the shaft, the insulated ring or collar 11 carried by the shaft, its tooth 3', the insulated collar 3, having a notch into which said tooth projects, the brush 4 bearing upon the collar 3 out of the path of said tooth, the brush 2, bearing upon the collar 3, and in the path of said tooth, the radial stop arm, connected with the collar 11, the magnet M and its armature lever, the main battery, circuit connections from the battery through coils of said magnet to its armature lever, and a circuit connection from the brush 2 to the main line.

In testimony whereof I have hereunto subscribed my name.

ROBERT J. SHEEHY.

Witnesses:
 FRANK S. OBER,
 EDWARD C. DAVIDSON.